United States Patent [19]

Tanaka

[11] Patent Number: 4,608,705

[45] Date of Patent: Aug. 26, 1986

[54] INFORMATION RETRIEVAL APPARATUS CAPABLE OF STOPPING AN INFORMATION BEARING MEDIUM ACCURATELY AT A DESIRED LOCATION

[75] Inventor: Kano Tanaka, Yokohama, Japan

[73] Assignee: Canon Kabushiki Kaisha, Tokyo, Japan

[21] Appl. No.: 583,836

[22] Filed: Feb. 27, 1984

[30] Foreign Application Priority Data

Mar. 1, 1983 [JP] Japan .................................. 58-33971
Jan. 25, 1984 [JP] Japan .................................. 59-11446

[51] Int. Cl.$^4$ .............................................. G06K 7/10
[52] U.S. Cl. ........................................ 377/18; 377/39; 377/53; 360/72.2; 360/74.6; 235/454; 353/26 A
[58] Field of Search ............. 377/8, 18; 353/25, 26 R, 353/26 A; 250/570; 360/72.2, 74.6; 235/454

[56] References Cited

U.S. PATENT DOCUMENTS

| | | | |
|---|---|---|---|
| 3,950,652 | 4/1976 | Yamashita ............................ | 250/570 |
| 4,016,406 | 4/1977 | Eiji Abe et al. ...................... | 377/18 |
| 4,351,591 | 9/1982 | Stockett .............................. | 353/25 |
| 4,356,387 | 10/1982 | Tsubota et al. ...................... | 377/6 |
| 4,453,823 | 6/1984 | Sugita et al. ........................ | 250/570 |
| 4,514,641 | 4/1985 | Tanaka et al. ....................... | 250/570 |

FOREIGN PATENT DOCUMENTS 1439047 6/1976 United Kingdom ................ 250/570
667975 6/1979 U.S.S.R. .............................. 250/570

*Primary Examiner*—John S. Heyman
*Assistant Examiner*—Karl Ohralik
*Attorney, Agent, or Firm*—Fitzpatrick, Cella, Harper & Scinto

[57] ABSTRACT

The disclosed apparatus retrieves automatically desired information on an information bearing medium having information and marks. In the retrieving apparatus, the marks are detected and counted during the feed of the information bearing medium. In accordance with the number of the counted marks, the feeding of the data bearing medium is controlled to retrieve the desired data. The apparatus is provided with at least three mark-detecting means for successively detecting the mark and memory means for memorizing the detections of the mark by the respective mark-detecting means, and a mark counting signal is formed from the content in said memory means and the counting signal is counted in order to eliminate the possibility that one and same mark may erroneously be counted twice or more when the feeding speed of the information bearing medium is abruptly changed.

8 Claims, 10 Drawing Figures

INFORMATION RETRIEVAL APPARATUS CAPABLE OF STOPPING AN INFORMATION BEARING MEDIUM ACCURATELY AT A DESIRED LOCATION

BACKGROUND OF THE INVENTION

1. Field of the Invention

The present invention relates to apparatus for automatically retrieving desired data or information on an information bearing medium such as recording film or tape by detecting marks on the medium and counting the detected marks.

2. Description of Prior Art

In the art it is known to retrieve desired image data or information previously recorded on a film by counting particular marks provided on the side of the individual images in the film. When the number of the counted marks coincides with the address of the desired image, the film-feeding device is stopped. This conventional retrieving method involves a problem, in particular when high retrieving speed is desired.

In order to increase the retrieving speed it is required to speed up the feed of film. However, with increasing the film-feeding speed it is more difficult to stop the film exactly at the aimed address owing to the inertia of the film-feeding device and the like.

As a solution to the problem it has already been proposed to change the film-feeding speed from high to low before the content of the mark counter reaches the aimed address. But, retrieving according to the solution has been found to often fail to stop that film just at the aimed address. The failure is caused mainly by such that when the film-feeding device is changed over to the lower speed, the film moves in the opposite direction to the feeding direction owing to the inertia of the film reel and other mechanical elements. This phenomenon is well-known to those skilled in the art as back-lash phenomenon. If such a back-lash occurs, then the mark counter counts one mark extra and therefore the coincidence between the number of the counted marks and the address of the desired image is lost. This leads to an error in retrieving data.

According to another prior art retrieving method proposed to solve the above-mentioned problem, the film is fed at first at a high speed until the aimed address and then a film stop instruction is issued at the aimed address to stop the film after over running the aimed address some distance. Thereafter, the film is moved back to the aimed address at a speed sufficiently low enough to stop the film just at the aimed address. However, this retrieving method also has suffered from back-lash. Since the film running at a high speed is abruptly stopped, the film oscillates in the film-feed direction owing to the back-lash or other factors at the stop. As a result, the mark counter may count one mark twice or more, which again leads to error in retrieving data like the first-mentioned solution.

SUMMARY OF THE INVENTION

Accordingly it is an object of this invention to provide a data retrieving apparatus which enables retrieval of the desired data in a data bearing medium without fail.

It is another object of the invention to provide a data retrieving apparatus which enables to retrieve the desired data automatically and in a short time.

It is a further object of the invention to prevent errors in retrieving data even when the feeding speed of the data bearing medium is changed abruptly and to assure always correct retrieval of the desired data.

Other and further objects, features and advantages of the present invention will appear more fully from the following description taken in connection with the accompanying drawings.

DESCRIPTION OF PREFERRED EMBODIMENTS

Figure 1:
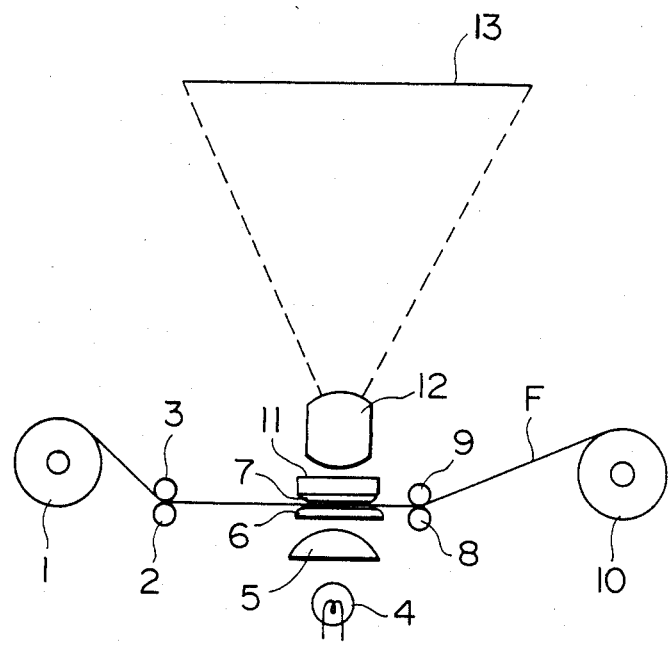
FIG. 1 is a schematic view of a film reader provided with a retriever according to the invention.

Referring first to FIG. 1 showing a film reader provided with a retriever according to the present invention, a microfilm F extends between a supply reel 1 and a take-up reel 10 along a determined film passage. The film F is guided by a pair of guide rollers 2 and 3 and passed through between a pair of transparent glass plates 6 and 7, element 4 is a film illumination lamp and 5 is a condenser lens, and 8 is a capstan roller and 9 is a pinch roller. The supply reel 1 and the take-up reel 10 are connected with a motor for film tension and taking-up (not shown). The capstan roller 8 is connected with a film driving motor (not shown).

The microfilm F can be moved forwards in the direction toward the take-up reel 10 from the supply reel 1 and backwards in the direction toward the supply reel from the take-up reel. Designated by 11 is a mark detector for detecting marks on the film F. Member 12 is a projection lens disposed opposed to the lamp 4 relative to the film F, and 13 is a screen. The part of the film entering the space between the glass plates 6 and 7 is illuminated by the light emitted from the illumination lamp 4. Thus, information (sometimes referred to herein as "data") in the form of an image recorded in the illuminated frame of the film F is projected on the screen 13 through the projection lens 12.

Figure 2:
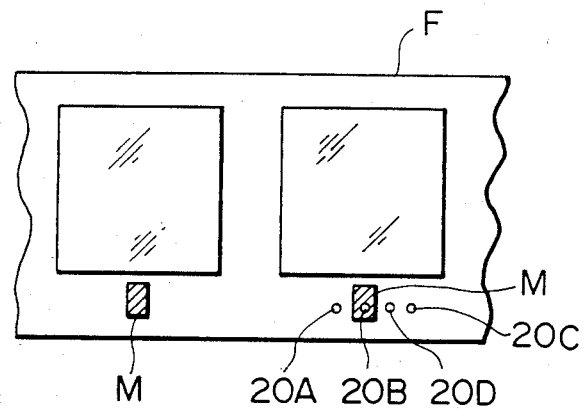
FIG. 2 is a view illustrating the positional relationship between mark detector and mark.

FIG. 2 illustrates the positional relationship between mark and mark detector. The mark detector 11 comprises four detectors each having a photo-electric transducer element (hereinafter referred to as sensor). In FIG. 2, these four sensors are designated by 20A, 20B, 20C and 20D. As shown in the figure, the sensors are arranged at determined intervals along the film passage so that a mark M on the film F is detected successively by the four sensors. Marks M are provided on the underside marginal area of the film one mark per image frame. The mark M has a different density from the base of the film. In the shown embodiment, the mark M is formed as an opaque mark. Of course there may be used also transparent marks.

The spaces between the first and second sensors 20A and 20B and between the second and third sensors 20B and 20C are so selected as to be larger than the amount of oscillation of the film in the film-feed direction produced when the film-feeding speed is abruptly decreased down or when the film is stopped. The fourth sensor 20D is disposed close to the second sensor 20B to stop the film accurately at a determined position. If the film need not be stopped so accurately, the fourth sensor may be omitted. The distance from the first sensor 20A lying on the most-upstream side to the third sensor 20C lying on the most-downstream side as viewed in the film-feeding direction is so selected as to be shorter than the minimum distance between marks M.

When the light running toward the sensor is momentarily shut off by an opaque mark M, the sensor generates a high level signal informing of the detection of mark. In this manner, when the film F is moving from left to right as viewed in FIG. 2, the four sensors successively generate pulse signals in the order of 20A, 20B, 20D and 20C. When the film is being moved in the opposite direction, the sensors successively generate also pulse signals in the order opposite to the above.

Although not shown, the light signal from the mark may be guided to the sensor through an optical member such as optical fiber or mirror.

Figure 3:
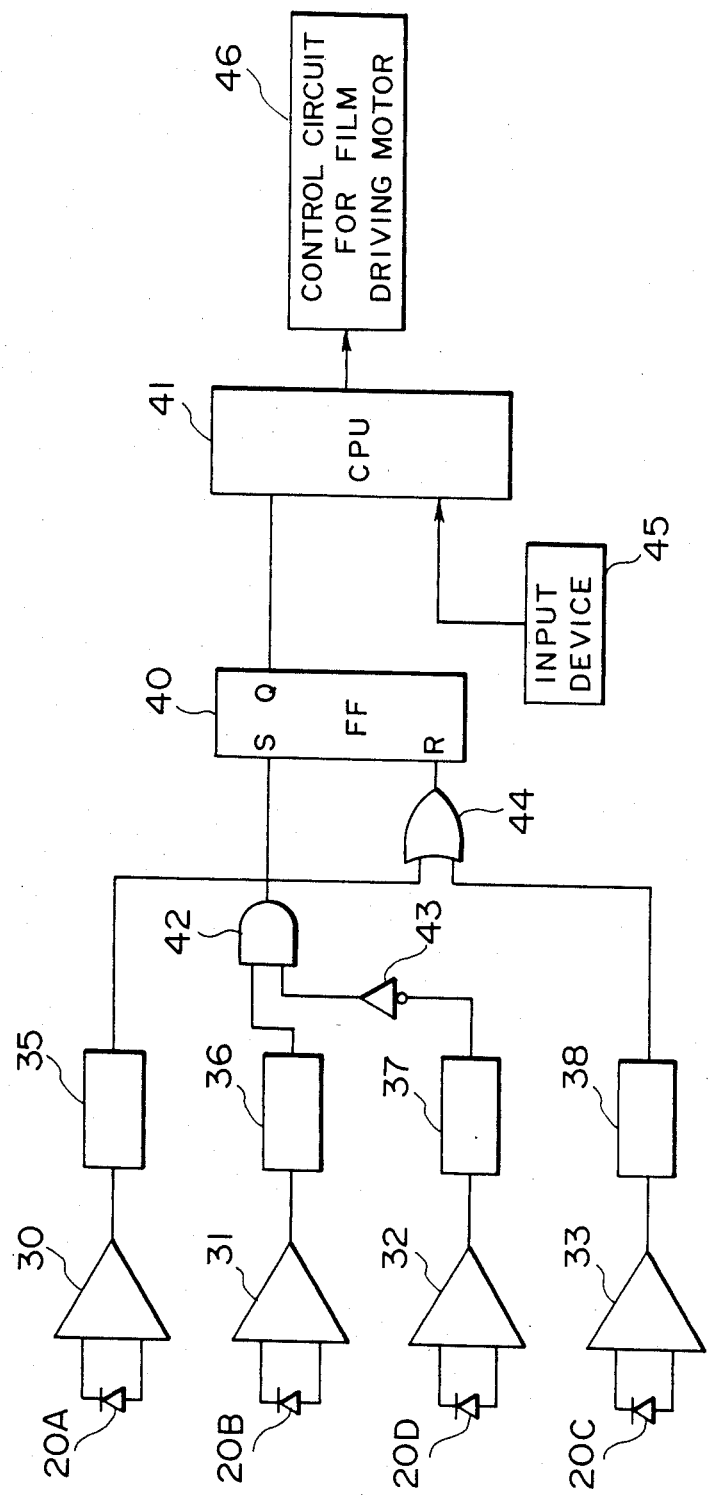
FIG. 3 shows a control circuit for the retriever according to the invention.

FIG. 3 shows a form of the control circuit of the retriever. In FIG. 3, reference characters 30-33 denote amplifiers, 35-38 are waveform-shaping circuits, 40 is a flip-flop for memorizing the mark detection state of each sensor and 41 is a central processing/controlling unit comprising a micro-computer (which is hereinafter referred to briefly as CPU). Element 42 is and AND-gate, 43 is an inverter, 44 is an OR-gate and 45 is an input device for inputting the address of a desired image to be retrieved. Designated by 46 is a film-driving motor control circuit by which the film-driving motor is controlled to drive and stop the film.

The shaping circuits 35, 36, 37 and 38 are connected with the sensors 20A, 20B, 20D and 20C through the amplifiers 30, 31, 32 and 33 respectively. When a mark is detected by one of the sensors, the shaping circuit connected with the sensor generates a high level signal. As long as the sensor detects no mark, the shaping circuit generates a low level signal. The flip-flop 40 is set by the rising of a high level signal when the high level signal is applied to its set-input terminal S. When a high level signal is applied to its reset-input terminal R, the flip-flop is reset at the rise time of the signal.

Figure 4:
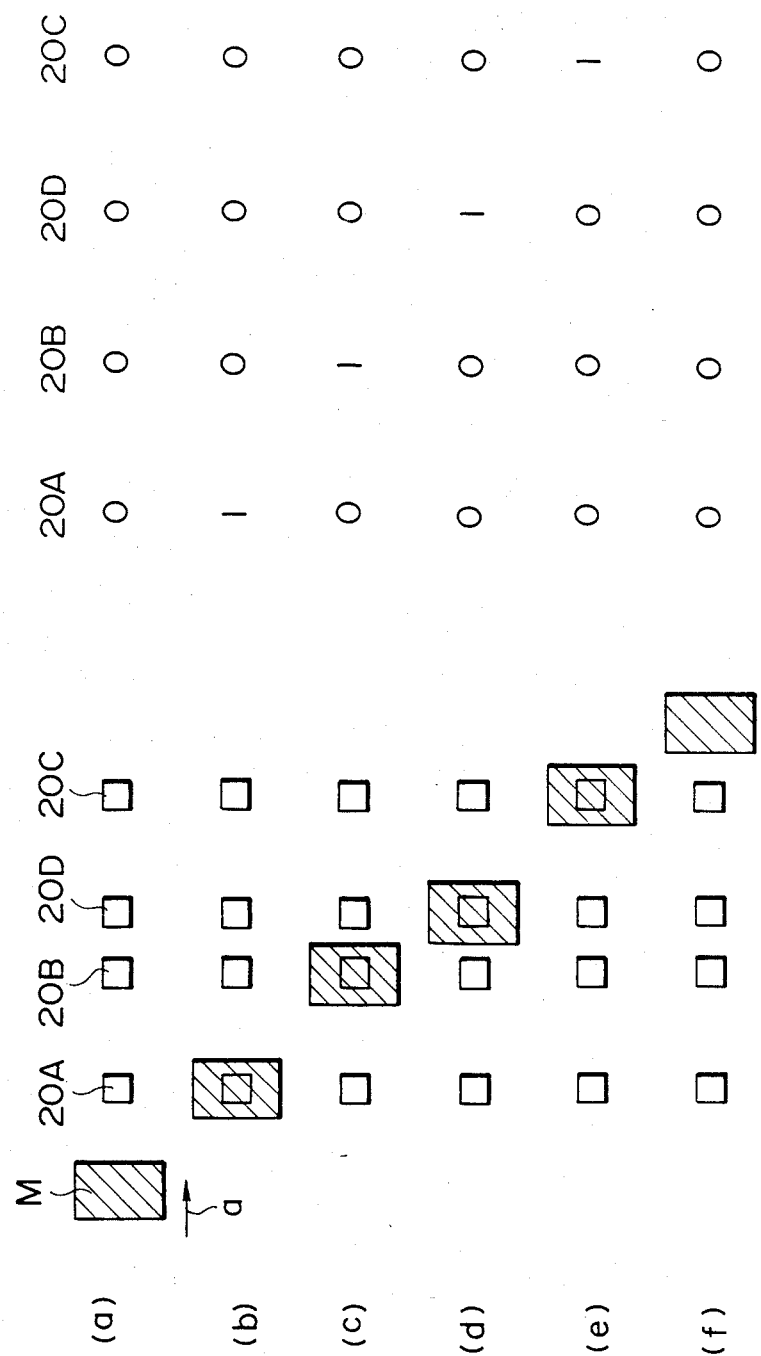
FIG. 4 is a view illustrating the manner of mark detection by the respective mark detectors and the outputs of the mark detectors.

FIG. 4 illustrates the mark detection by the respective sensors and the logical outputs of them.

In FIG. 4, it is assumed that a film F is now being moved in the direction of arrow a. In the state shown in FIG. 4-(a), none of the four sensors 20A-20D detects the mark M. Therefore, all the sensors have outputs of logical "0".

When the mark M is moved to the position shown in FIG. 4-(b), the first sensor 20A detects the mark and its output changes to "1". Since the remaining three sensors 20B-20D do not detect the mark at the time, their outputs remain all "0". As the mark M is detected by the first sensor 20A, the shaping circuit 35 generates a high level signal by which the flip-flop 40 is reset.

When the mark M is further moved to the position shown in FIG. 4-(c), it is detected by the second sensor 20B. The logical output of the sensor 20B changes to "1" and then the shaping circuit 36 generates a high level signal. At that time, since the fourth sensor 20D detects no mark, the AND-gate 42 opens to put out a high level signal by which the flip-flop 40 is set. As the flip-flop is set, a high level pulse signal is generated from its Q-output terminal as a mark detection signal. The mark detection signal is then transmitted to CPU 41 and is counted by its counting part in addition mode or subtraction mode. The counting part of CPU 41 can be changed over between mode for addition operation and mode for subtraction operation according to the film-feeding direction at that time.

After a further advance of the film, the mark M reaches the position shown in FIG. 4-(d). In this position, the mark M is detected by the fourth sensor 20D.

In the next position shown in FIG. 4-(e), the mark M is detected by the third sensor 20C. At the time, the output of the sensor 20C changes to "1" by which the flip-flop 40 is reset.

After the mark M has passed over the position shown in FIG. 4-(f), the next mark on the film enters the detection area of the first sensor 20A. In this manner, marks M on the film are sequentially detected by the mark detector 11. During the passing of marks over the detection area of the mark detector 11, therefore, the flip-flop 40 generates a detection signal every time when the positional relation between mark and sensor gets in the state as shown in FIG. 4-(c). In the comparing part of CPU 41, the content of the counting part and the address of the desired image are continuously compared with each other. When the former gets in coincidence with the latter, CPU 41 generates a stop signal which is transmitted to the film-driving motor control circuit 46. Thereby the film-driving motor and also the capstan roller 8 are stopped. Consequently, when the film is stopped, the mark of the desired image and the sensors are in the positional relation as shown in FIG. 4-(c). If the film-feeding speed is abruptly changed or the microfilm is abruptly stopped, the film may move oscillating a little in the film-feeding direction at the position shown in FIG. 4-(c). However, even if such an oscillation occurs, there is no possibility that two or more mark detection signals may erroneously be generated by one and same mark. This is because in the state shown in FIG. 4-(c), the first and third sensors are out of the oscillation range of the mark and the flip-flop 40 is always in the state of being set. Therefore, wrong counting of marks is avoided and the problem of error in retrieving caused by the oscillation of the stopped film can be eliminated completely.

For the film being moved in the opposite direction to the arrow a, the retriever is operated entirely in the same manner as above. Again, a mark detection signal is generated every time when a mark comes into the position shown in FIG. 4-(c). And when the mark of the desired image frame is detected, the film is stopped in the position shown in FIG. 4-(c).

In this manner, the position at which the retrieved image frame is stopped is kept constant irrespective of the direction in which the film is fed. Therefore, as soon as the desired data is retrieved and the film is stopped, the data can be projected on a determined area of the screen.

Even when the film-feeding direction is reversed at any time point, the correspondency of counter content to mark address is never lost. There is no possibility of retrieving-error being caused by the reversal of the film-feeding direction.

Figure 5:
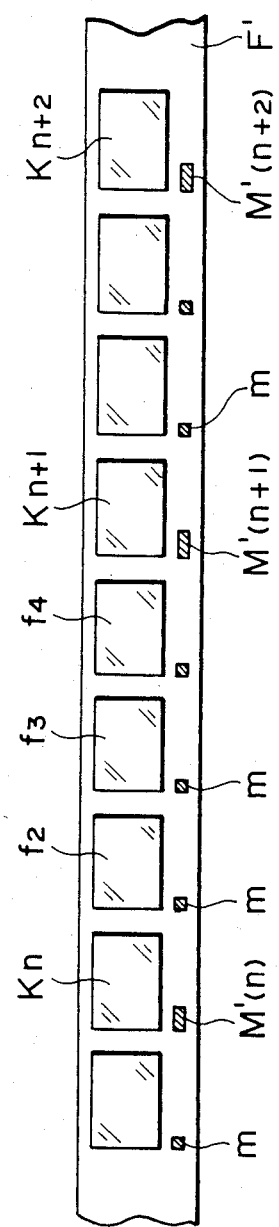
FIG. 5 shows another embodiment of microfilm.

FIG. 5 shows another embodiment of microfilm.

In this embodiment, page marks m and file marks M' are previously provided on a microfilm F'. These marks m and M' are arranged along the length of the film and in the marginal area under the row of image frames f as shown in FIG. 5. The marks are recorded in different density from the base of the film. In this embodiment, the marks are opaque marks. K(n) is the first one of a group (file) of frames in which a series of related image data have been recorded (there may be the case in which one group consists of one frame only). A file mark M' is provided below the first one K(n) of frames in one group. Other frames than the first one in one group have each a page mark m provided below the frame. The file mark M' has a shape longer than the page mark m measured along the length of the film.

In the example shown in FIG. 5, the n-th group from the leading end of the film F' (the leading end is on the left-hand side not shown) consists of four frames. The frame Kn of the group, the file number (address) of which is n, has a file mark M'(n) marked below the frame. The second, third and fourth frames $f_2$, $f_3$ and $f_4$ of the group of the file number n have each a page mark m provided below each the frame. The next group of the file number n+1 consists of three frames. The first frame Kn+1 of the group has a file mark M'n+1. Similarly, the first frame Kn+2 of the n+2th group counted from the leading end of the film F' has a file mark M'n+2.

For example, when a patent specification is recorded as a file of data on a microfilm page by page, a file mark M' is printed below the frame of the first page of the specification. Page marks m are given to other frames belonging to the same group in which the second and following pages of the specification are recorded respectively.

Figure 6:
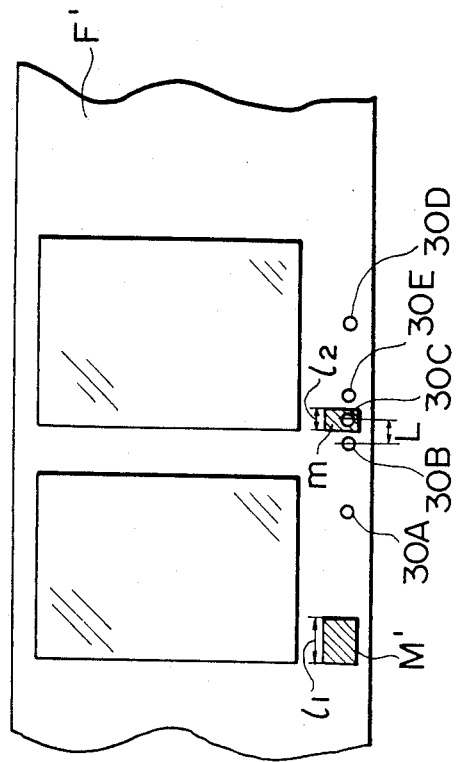
FIG. 6 is a view illustrating the relationship between mark detector and mark in another embodiment.

FIG. 6 shows the relationship between mark sensors and marks M', m.

In this embodiment, a mark detector comprises five mark sensors 30A–30E. As shown in FIG. 6, these mark sensors are arranged at determined intervals so that the marks M' and m on a moving film F' can be detected successively by the sensors. The space between the first and second sensors 30A and 30B and the space between the third and fourth sensors 30C and 30D are selected in such a manner that the space is larger than the amount of oscillation of the film possibly caused when the film-feeding speed is suddenly decreased or the film is stopped. The space L between the second and third sensors 30B and 30C is so selected as to be shorter than the length $l_1$ of the image of the file mark M' projected on the detector but longer than the length $l_2$ of the projected image of the page mark m. The fifth sensor 30E is positioned close to the third sensor 30C. The fifth sensor is provided to accurately stop the film at a predetermined position. If so high accuracy is not required in stopping the film, the fifth sensor may be omitted. The distance from the first sensor 30A lying on the most-upstream side to the fourth sensor 30D lying on the most-downstream side as viewed in the film-feeding direction is so selected as to be shorter than the minimum distance between marks.

When the light incident on the sensor is cut off by an opaque mark M', m, the state of the sensor changes and generates a high level signal. If the film F' is being moved from left to right as viewed in FIG. 6, pulse signals are sequentially generated from the five sensors in the order of 30A, 30B, 30C, 30E and 30D. When the film is being moved in the opposite direction, pulse signals are sequentially generated from the sensors in the reversed order.

If necessary, an optical member such as optical fiber or mirror may be used so that the sensor can receive the light signal from the mark not directly but through the optical member.

Figure 7:
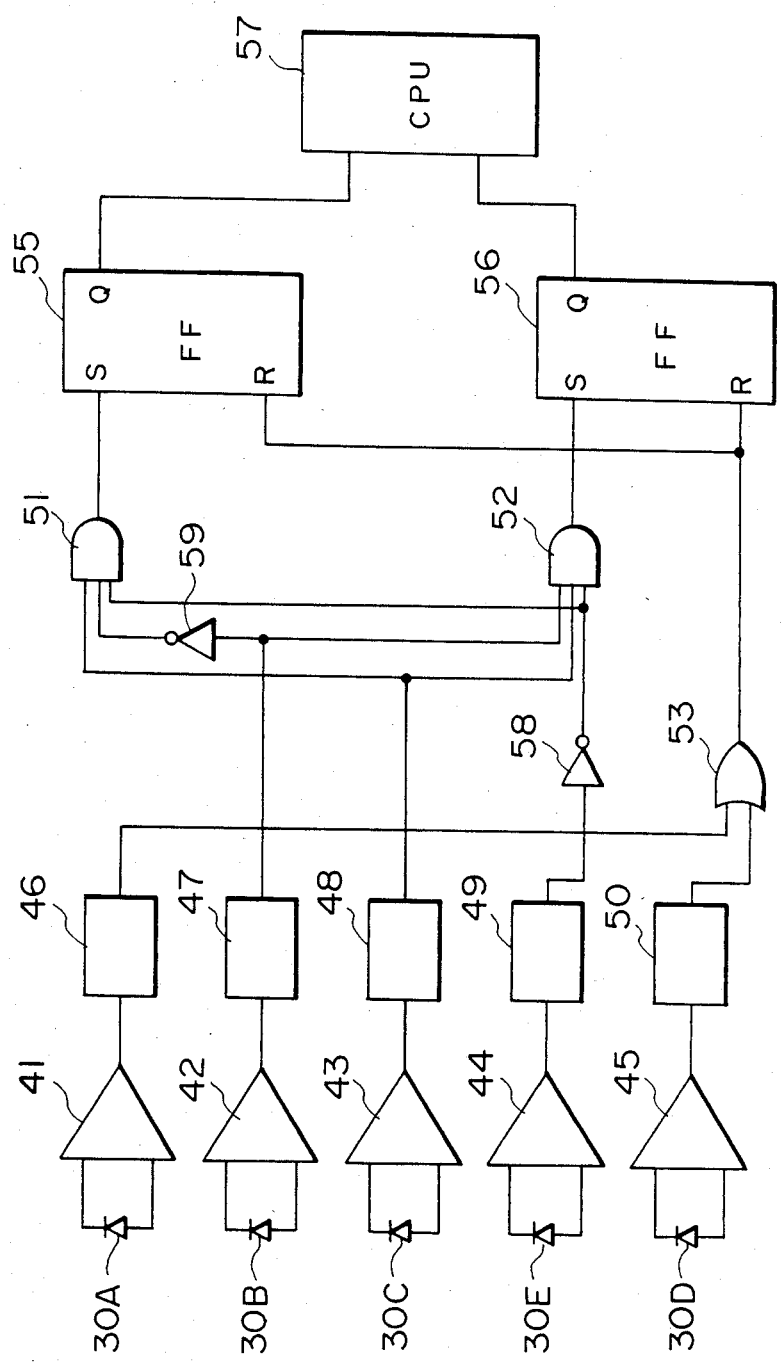
FIG. 7 is a circuit diagram showing another embodiment of the retriever according to the invention.

FIG. 7 shows another embodiment of the control circuit for the retriever.

In FIG. 7, 41–45 are amplifiers, 46–50 are waveform shaping circuits, 55, 56 are flip-flop for memorizing the mark detection by the sensor, 57 is a central processing control unit (CPU) comprising a micro-computer, 51, 52 are AND-gates, 53 is an OR-gate and 58, 59 are inverters. Each of the shaping circuits 46–50 generates a high level signal when the sensor connected with the shaping circuit detects a mark. So long as the sensor detects no mark, the shaping circuit generates a low level signal.

Each of the flip-flop 55, 56 is set at the rise time of a high level signal applied to its set-input terminal S. When a high level signal is applied to its reset-input terminal R, the flip-flop is reset at the rise time of the signal.

The manner of detection of page mark m and file mark M' by mark sensors and the outputs of the respective sensors will be described with reference to FIGS. 8 and 9.

Figure 8:
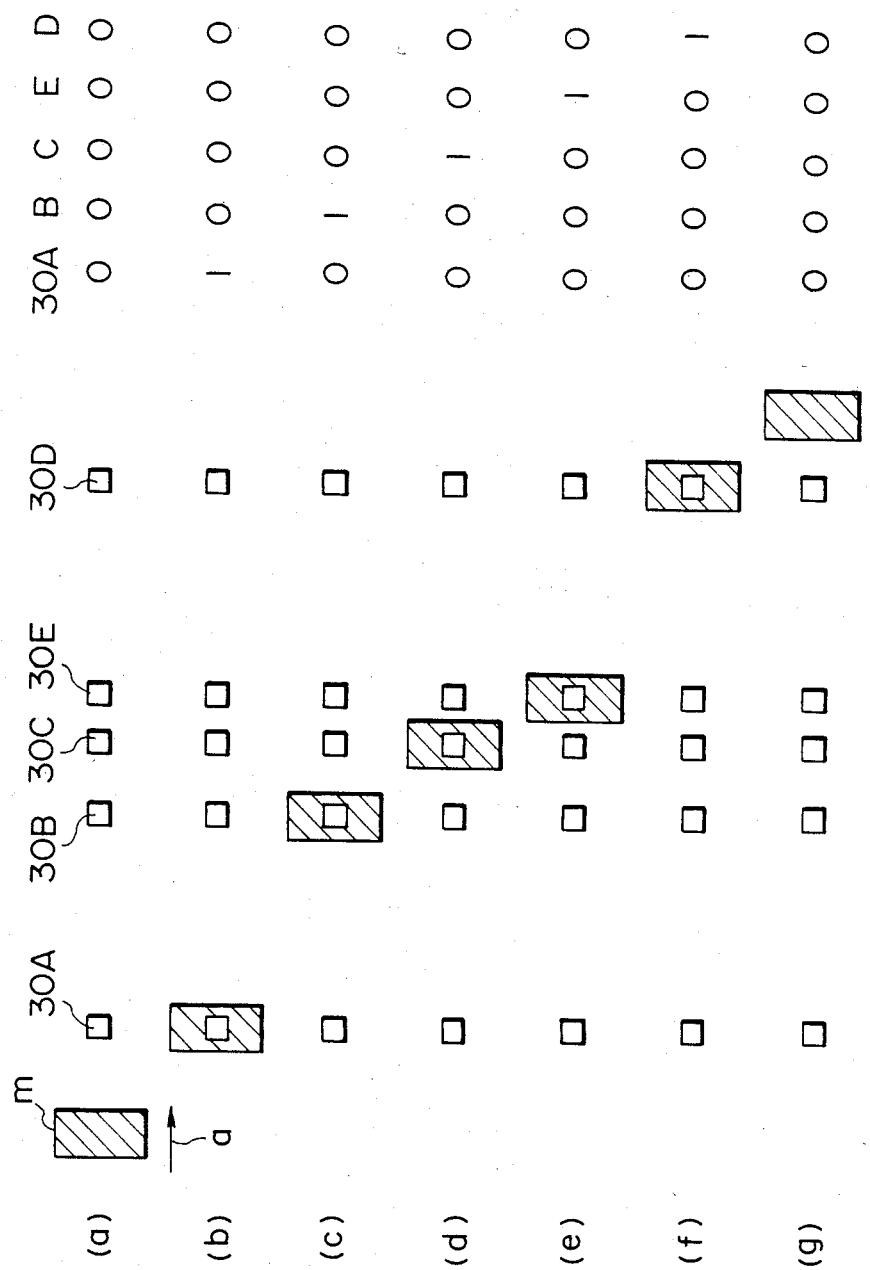
FIGS. 8 and 9 are views illustrating the manner of mark detection by mark detectors and the outputs of the detector.

In FIG. 8, a film is now being moved in the direction of arrow a. In the position as shown in FIG. 8-(a), none of the five sensors 30A–30E detects the page mark m. Therefore, the outputs of the sensors are all "0".

When the film with the page mark m is moved to the position shown in FIG. 8-(b), the first sensor 30A detects the mark and the output thereof changes to "1". The outputs of the remaining sensors remain "0" because they do not detect the mark at the time. As the first sensor 30A detects the mark m, the shaping circuit 46 generates a high level signal by which the first and second flip-flops 55 and 56 are reset.

In the position shown in FIG. 8-(c), the second sensor 30B detects the page mark m and the output of the sensor changes to "1". The shaping circuit 47 connected with the second sensor generates a high level signal. But, the first and second flip-flops 55 and 56 remain in the reset state.

When the film is further advanced to the position shown in FIG. 8-(d), the third sensor 30C detects the page mark m and its output changes to "1". Consequently, the shaping circuit 48 generates high level signal. Since neither the second sensor 30B nor the fifth sensor 30E detects the mark, at the time, the AND-gate 51 opens to set the first flip-flop 55. As the first flip-flop 55 is set, a high level pulse signal is generated from the Q-output terminal of the first flip-flop 55. As a page mark detection signal, the pulse signal is transmitted to CPU 57 and counted up or down by the counting part of CPU.

In the position shown in FIG. 8-(e), the fifth sensor 30E detects the page mark. When the film is further moved to the position shown in FIG. 8-(f), the fourth sensor 30D detects the page mark m and its output level changes to "1" by which the first and second flip-flop 55 and 56 are reset. After the page mark has passed over all of the five sensors as shown in FIG. 8-(g), the next mark M' of m comes into the detection area of the first sensor 30A.

The manner of detection of a file mark M' is described with reference to FIG. 9.

Figure 9:
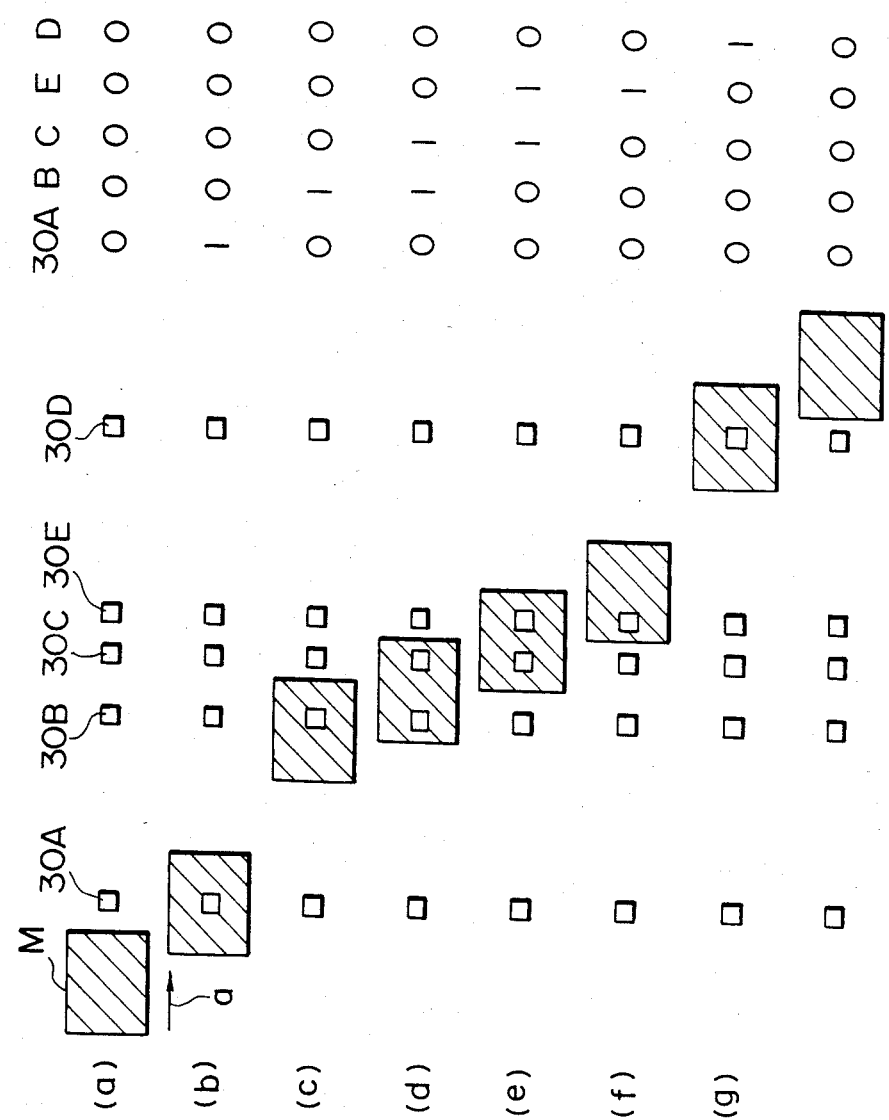

In FIG. 9, a film is now being moved in the direction of arrow a. In the position shown in FIG. 9-(a), a file mark M' on the film is before the area of the detector. The outputs of the sensors are all "0".

When the mark M' is advanced to the position shown in FIG. 9-(b), the first sensor 30A detects the file mark M' and the output of the first sensor changes to "1". At the detection, the shaping circuit 46 generates a high level signal by which the flip-flops are reset.

When the mark M' is moved to the position (d) through (c) in FIG. 9, the second and third sensors 30B and 30C detect the file mark at the same time and the shaping circuits 47 and 48 connected to the sensors generate high level signals by which the AND-gate 52 is opened to set the second flip-flop 56. As the second flip-flop is set, a high level pulse signal is generated from its output terminal Q. As a file mark detection signal, this pulse signal is transmitted to CPU 57 and counted up or down by the counting part of CPU 57.

When the mark M' on the film is moved to the position shown in FIG. 9-(g), the fourth sensor 30D detects the file mark M' and then the first and second flip-flops 55 and 56 are reset.

Figure 10:
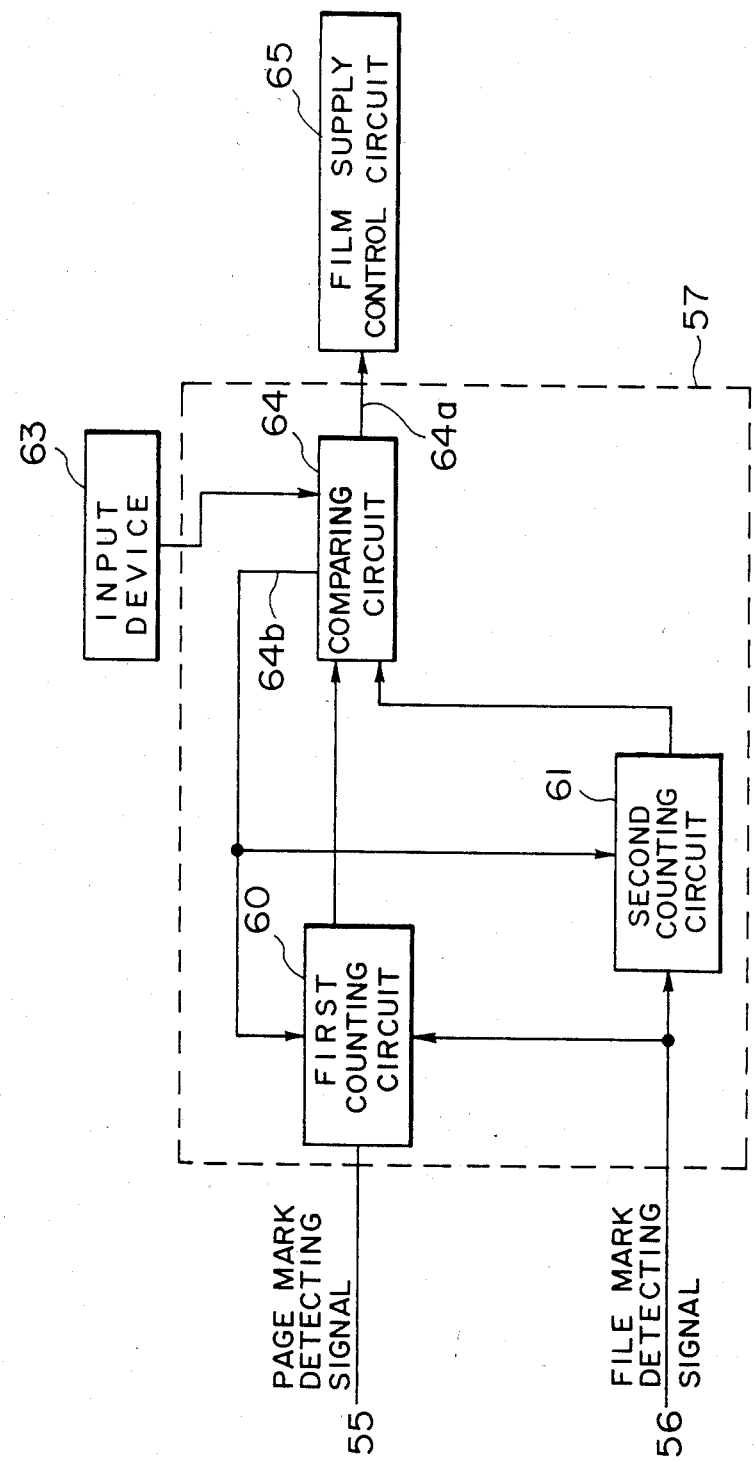
FIG. 10 is a block diagram showing a form of the central control circuit.

FIG. 10 shows an example of a CPU.

In FIG. 10, 60 is a first counting circuit and 61 is a second counting circuit. The first counting circuit 60 counts the page mark detecting signals generated from the Q-output terminal of the first flip-flop 55. The second counting circuit 61 counts the file mark detecting signals from the Q-output terminal of the second flip-flop 56.

The first counting circuit 60 is reset to "1" (or to "0") when a file mark detecting signal is generated from the second flip-flop 56.

Designated by 63 is an input device for the input of the address of a desired frame. The input device has ten keys. If it is desired to retrieve a frame at the address of X file, Y page, an operator inputs the file number X and the page number Y by the input device 63. The input numbers are compared with counter contents of the first and second counting circuits 60 and 61 by a comparing circuit 64. 65 is a film supply control circuit for controlling the driving of a film-feeding motor.

The comparing circuit 64 generates from its output terminal 64a a film supply signal and a signal informing of the direction of film supply so long as the input numbers and the counter contents of the counting circuits 60, 61 are not coincident with each other. In response to the signals from the comparing circuit, the film-feeding motor rotates in a determined direction to supply the film in the direction. From another output terminal 64b the comparing circuit 64 also generates a signal informing of the direction of film supply. According to the feed direction signal, the mode of the first and second counting circuits 60 and 61 is changed over from mode for addition to mode for subtraction and vice versa. For example, when the film is being moved toward the take-up reel, the first and second counters count the received mark detecting signals in addition mode. When the film is being moved back to the supply reel, the counters count the received mark detecting signals in subtraction mode.

When the counter contents of the first and second counting circuits get in coincidence with the input address of the desired frame, the comparing circuit 64 generates a stop signal from its terminal 64a to stop the motor. A brake mechanism is also actuated to stop the film. Thus, the desired frame is located at the determined position in which it is illuminated by the lamp 4. The image data recorded in the frame is projected on the screen 13 through the projection lens 13.

In the same manner, the desired frame can automatically be retrieved also in the case of the opposite film-feeding direction to the above.

As will be understood from the foregoing, the apparatus according to the present invention has very high reliability in retrieving operation. Even when the film oscillates in the feeding direction at the time of change of the film-feeding speed, there is no possibility that one and same mark may erroneously be counted twice or more. Therefore, errors in retrieving the desired information as caused by such oscillation of the film are eliminated. The retriever according to the invention never fails to retrieve the desired information.

While the invention has been particularly shown and described with reference to preferred embodiments thereof, it will be understood that various modifications may be made therein. For example, in the above embodiment, the first flip-flop 55 has been set when the mark enters the position shown in FIG. 8-(d). However, the embodiment may be modified in such manner that the flip-flop 55 is set when the mark enters the position shown in FIG. 8-(c). In this modification, the AND-gate 51 in FIG. 7 is omitted and the output terminal of the shaping circuit 47 is connected directly to the S-input terminal of the first flip-flop 55.

Also, there may be used any suitable known means for memorizing the state of mark detection instead of the shown flip-flops 55, 56.

If there is used such a film which has three or more different kinds of marks having different sizes, the number of mark detectors is increased according to the kinds of marks then used so that the same effect as the above of the invention can be obtained for preventing errors in retrieving desired data.

What I claim is:

1. Apparatus for retrieving desired information from an information bearing medium making use of marks provided thereon, comprising:
   means for feeding said information bearing medium;
   at least three detection means for detecting the marks on said information bearing medium, said at least three mark-detecting means being arranged at determined intervals in the direction in which said information bearing medium is fed;
   memory means which assumes a first state when a mark on said information bearing medium is detected by the first mark-detecting means lying on the most-upstream side or by the second mark detecting means lying on the most-downstream side as viewed in the feeding direction of said information bearing medium and which assumes a second state when the mark is detected by the third mark detecting means lying between said first and second mark-detecting means;
   means for counting output signals generated when said memory means assumes said second state; and
   control means for controlling said feeding means in accordance with the counter content of said counting means.

2. Apparatus according to claim 1, wherein said memory means comprises a flip-flop.

3. Apparatus according to claim 1, wherein said mark-detecting means comprises a light source for illuminating said information bearing medium and a photoelectric element for receiving the light from said mark.

4. Apparatus according to claim 1, wherein the distance between said first and third mark-detecting means and the distance between said second and third mark-detecting means are greater than the amount of oscillation of said information bearing medium caused by any change of the feeding speed of said information bearing medium.

5. Apparatus for retrieving desired information from an information bearing medium having at least two kinds of marks different from each other in length measured in the feeding direction of said information bearing medium making use of said marks, said retrieving apparatus comprising:
   means for feeding said information bearing means;
   at least four mark-detecting means for detecting said marks on said information bearing medium, said mark-detecting means being arranged at determined intervals in the direction in which said information bearing medium is fed;
   first memory means which assumes a first state when a mark on said information bearing medium is detected by first mark-detecting means lying on the most-upstream side or by the fourth mark-detecting means lying on the most-downstream side as viewed in the feeding direction of said information bearing medium and which assumes a second state when the mark is detected by the second mark-detecting means lying between said first and fourth mark-detecting means;
   second memory means which assumes a first state when the mark is detected by said first or fourth mark-detecting means and which assumes a second state when the mark is detected by said second and third mark-detecting means at the same time;
   first counting means for counting signals produced when said first memory means assumes the second state;
   second counting means for counting signals produced when said second memory means assumes the second state; and
   control means for controlling said feeding means in accordance with the counter contents of said first and second counting means.

6. Apparatus accordint to claim 5, wherein said first counting means is reset when said second memory means assumes the second state.

7. A retrieving apparatus which detects a mark provided on each frame of a film to stop a desired frame of the film at a predetermined position, comprising:
   film feeding means for feeding the film forward and backward;
   at least three mark detecting means disposed in a line substantially along the feeding path of the film, each mark detecting means being spaced from the others in the film feeding direction for serial mark detection;
   memory means which assumes a first state upon detection of a mark on the film by the first mark detecting means located in a position where it detects the mark first upon feeding the film or by the second mark detecting means located in a posititon where it detects the mark last upon feeding the film and which assumes a second state when the third mark detecting means located in a position where it detects the mark after said first detecting means or second detecting means detects the marks;
   counting means for counting signals generated when the memory means has assumed the second state; and
   feed control means for controlling said film feeding means in accordance with a comparison of the counted number by the counting means with address of the desired frame.

8. An apparatus according to claim 7, wherein a fourth mark detecting means is provided between said second mark detecting means and the third mark detecting means, and said memory means assumes the second state when said third mark detecting means detects a mark and said fourth mark detecting means does not detect a mark.

* * * * *

UNITED STATES PATENT AND TRADEMARK OFFICE
CERTIFICATE OF CORRECTION

PATENT NO. : 4,608,705
DATED : August 26, 1986
INVENTOR(S) : KANO TANAKA

Page 1 of 2

It is certified that error appears in the above-identified patent and that said Letters Patent is hereby corrected as shown below:

Abstract, line 1, change "retrieves automatically" to --automatically retrieves--.

Column 1, line 32, change "the solution" to --that solution--;
line 34, after "such" insert --phenomenon--;
line 39-40, delete "phenomenon"; and
line 67, change "to retrieve" to --retrieval of--.

Column 3, line 25, after "sensors" insert --also--;
line 26, delete "also"; and
line 36, change "and" to --an--.

Column 4, line 46, after "and" insert --the--.

Column 5, line 58, after "high" insert --an--.

Column 8, line 16, after "and" insert --the--; and
line 40, delete "of the invention".

Claims 1, 7 and 8, change "mark detecting" to --mark-detecting-- (all occurrences).

UNITED STATES PATENT AND TRADEMARK OFFICE
CERTIFICATE OF CORRECTION

PATENT NO. : 4,608,705

DATED : August 26, 1986

INVENTOR(S) : KANO TANAKA

Page 2 of 2

It is certified that error appears in the above-identified patent and that said Letters Patent is hereby corrected as shown below:

Column 10, line 7, change "accordint" to --according--; and
line 24, change "posititon" to --position--.

Signed and Sealed this

Twentieth Day of January, 1987

Attest:

DONALD J. QUIGG

Attesting Officer

Commissioner of Patents and Trademarks